United States Patent [19]
Munakata et al.

[11] Patent Number: 5,640,205
[45] Date of Patent: Jun. 17, 1997

[54] VIDEO CAMERA APPARATUS AND A CAMERA CONTROL UNIT FOR CONTROLLING THE VIDEO CAMERA APPARATUS

[75] Inventors: Tamotsu Munakata; Masahiro Kawakami; Kinichi Ohtsu, all of Kanagawa, Japan

[73] Assignee: Sony Corporation, Tokyo, Japan

[21] Appl. No.: 539,119

[22] Filed: Oct. 4, 1995

[30] Foreign Application Priority Data

Oct. 7, 1994 [JP] Japan ..................... 6-244280

[51] Int. Cl.$^6$ .................................................. H04N 9/64
[52] U.S. Cl. ........................... 348/253; 348/222; 348/641
[58] Field of Search ......................... 348/222, 253, 348/649, 641, 651, 652, 653, 654; 358/28, 23; H04N 9/64, 9/66

[56] References Cited

U.S. PATENT DOCUMENTS 5,255,076  10/1993  Koyano ..................... 348/652
5,349,381  9/1994   Murayama et al. ......... 348/252
5,355,163  10/1994  Tomitaka .................. 348/253

*Primary Examiner*—Sherrie Hsia
*Attorney, Agent, or Firm*—William S. Frommer; Alvin Sinderbrand

[57] ABSTRACT

In a camera section, a luminance signal and the predetermined hue gate signal are modulated by a modulator in a quadrature modulation manner and the modulated signal is transmitted to a camera control unit via a cable. The modulated signal is separated by a branching filter in the unit and demodulated by a demodulator to generate the luminance signal and the detection signal. A signal to which the luminance signal and the detection signal are added, is used as a monitor video signal and a white image is displayed on a monitor screen within a range for the detection signal. Thus, the range detection signal can be observed with the monitor screen. Since the unit uses the added signal as the monitor video signal and the luminance signal for another purpose, the range of the detection signal can be observed by the monitor screen while using the luminance signal for another purpose.

7 Claims, 4 Drawing Sheets

VIDEO CAMERA APPARATUS AND A CAMERA CONTROL UNIT FOR CONTROLLING THE VIDEO CAMERA APPARATUS

BACKGROUND OF THE INVENTION

1. Field of the Invention

The present invention relates to a camera control unit and a video camera apparatus which is controlled by the camera control unit.

2. Description of the Related Art

A video camera which detects a hue, e.g., a skin tone, from a video signal, which generates a hue gate signal in accordance with the detected hue, and which controls the hue of the video signal based on the hue gate signal, is currently used. Further, in a video camera apparatus currently in use in which a video camera and a camera control unit are connected each other, the video camera can be controlled through the camera control unit. It has become increasingly desirable to provide a improved means which can control a hue of the video camera through the camera control unit.

SUMMARY OF THE INVENTION

In one aspect of the present invention, a video camera is comprised of a lens; a camera block for converting optical images from the lens into video signals; a means for generating image emphasis signals from the video signals; a means for detecting a portion of a predetermined hue of the video signals and generating hue gate signals representing the portion of the predetermined hue; an adding means for adding the image emphasis signals to the video signals; a quadrature two phase modulating means for separatably composing the video signals and the hue gate signals by quadrature two phase modulating the hue gate signals and the video signals so as to provide composite signals; and an output means for outputting the composite signals.

In another aspect of the present invention, a camera controlling unit is comprised of an inputting means for inputting video signals and composite signals composed of the video signals and hue gate signals representing a portion of predetermined hue of the video signals by quadrature two phase modulation; a quadrature two phase demodulating means for separating the composite signals into the video signals and the hue gate signals by quadrature two phase demodulating the composite signals; an adding means for adding the hue gate signals to the video signals; a first outputting means for outputting the video signals; and a second outputting means for outputting outputs of the adding means.

In still another aspect of the present invention, a video camera system is comprised of a video camera, a camera control unit, and a transmitting means. The video camera has a lens, a camera block for converting optical images from the lens into video signals, a means for generating image emphasis signals from the video signals, a means for detecting a portion of a predetermined hue of the video signals and generating hue gate signals representing the portion of the predetermined hue of the video signals, an adding means for adding the image emphasis signals to the video signals, and a quadrature two phase modulating means for separatably composing the video signals and the hue gate signals by quadrature two phase modulating the hue gate signals and the video signals so as to provide composite signals. The camera control unit has an inputting means for inputting the composite signals, and a quadrature two phase demodulating means for separating the composite signals into the video signals and the hue gate signals by quadrature two phase demodulating the composite signals. The transmitting means transmits the composite signals from the video camera to the camera control unit.

Additional objects and advantages of the present invention will be apparent from the following detailed description of a preferred embodiment thereof, which is best understood with reference to the accompanying drawings.

DESCRIPTION OF THE PREFERRED EMBODIMENT

Figure 1:
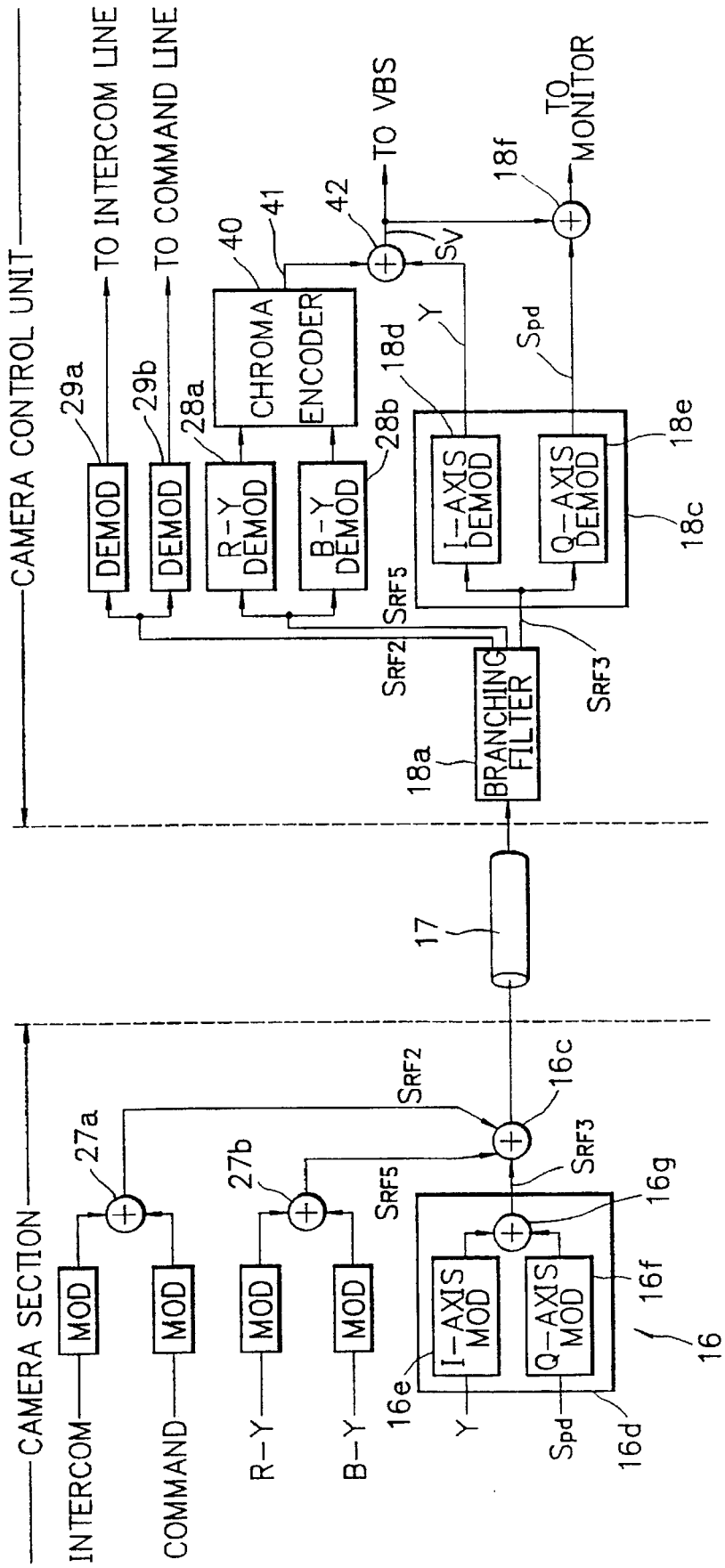
FIG. 1 is a block diagram of first embodiment of a video camera apparatus according to this invention.

A camera according to the present invention is described below with reference to FIG. 6. In a camera shown in FIG. 6, a predetermined hue gate signal SPD is combined with a luminance signal Y and the combined signal is transmitted from a camera section to a camera control unit 18. In a transmission circuit 16 of the camera section side, an adder 16a adds the luminance signal Y to the predetermined hue gate signal SPD and the output therefrom is modulated by a modulator 16b so as to form the RF signal SRF1. Then, the RF signal SRF1 is added to another RF signal SRF2 by an adder 16c and is applied to a branching filter 18a of the camera control unit 18 via a cable 17. The branching filter 18a generates a RF signal SRF2 and another RF signal SRF1 which is supplied to a demodulator 18b wherein such signal is demodulated.

In such configuration, the range of the predetermined hue gate signal SPD on a monitor screen of the camera control unit 18 can be observed so that the detected hue can be changed by the camera control unit 18 and the predetermined hue gate signal SPD can be obtained in the desired hue range.

Figure 6:
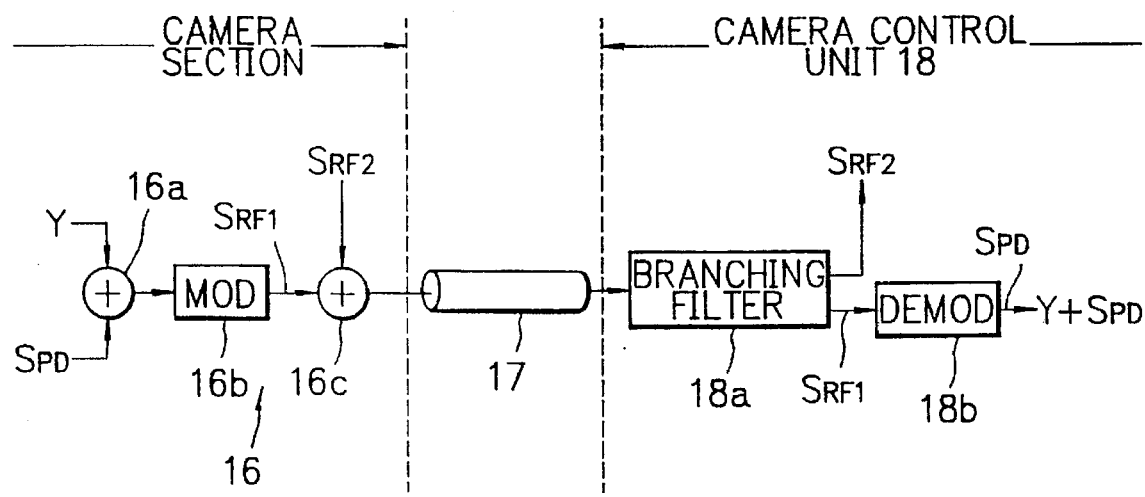
FIG. 6 is a block diagram of a conventional video camera apparatus according to the present invention.

In the case that the predetermined hue gate signal is added to the luminance signal Y and transmitted from the camera side to the camera control unit 18 as shown in FIG. 6, the camera control unit 18 cannot separate the predetermined hue gate signal SPD from the luminance signal Y. When the camera control unit 18 processes the luminance signal Y for another usage, such as an on-air operation, the camera side cannot adds the predetermined hue gate signal SPD to the luminance signal Y. Thus, it is impossible to observe the hue range for the predetermined hue gate signal SPD by the monitor screen. It is a problem not to be able to adjust the hue range of the predetermined hue gate signal SPD by changing the detected hue in the camera control unit side 18.

A video camera apparatus which can solve such problem is described below with reference to FIGS. 1 and 3. In this embodiment, the luminance signal Y and the predetermined hue gate signal SPD are modulated in a quadrature modulation manner and the modulated signal is transmitted from the camera section side to the camera control unit section 18. The same reference numbers in FIG. 1 have been designate like parts in FIG. 6 and only the difference will be discussed.

Figure 3:
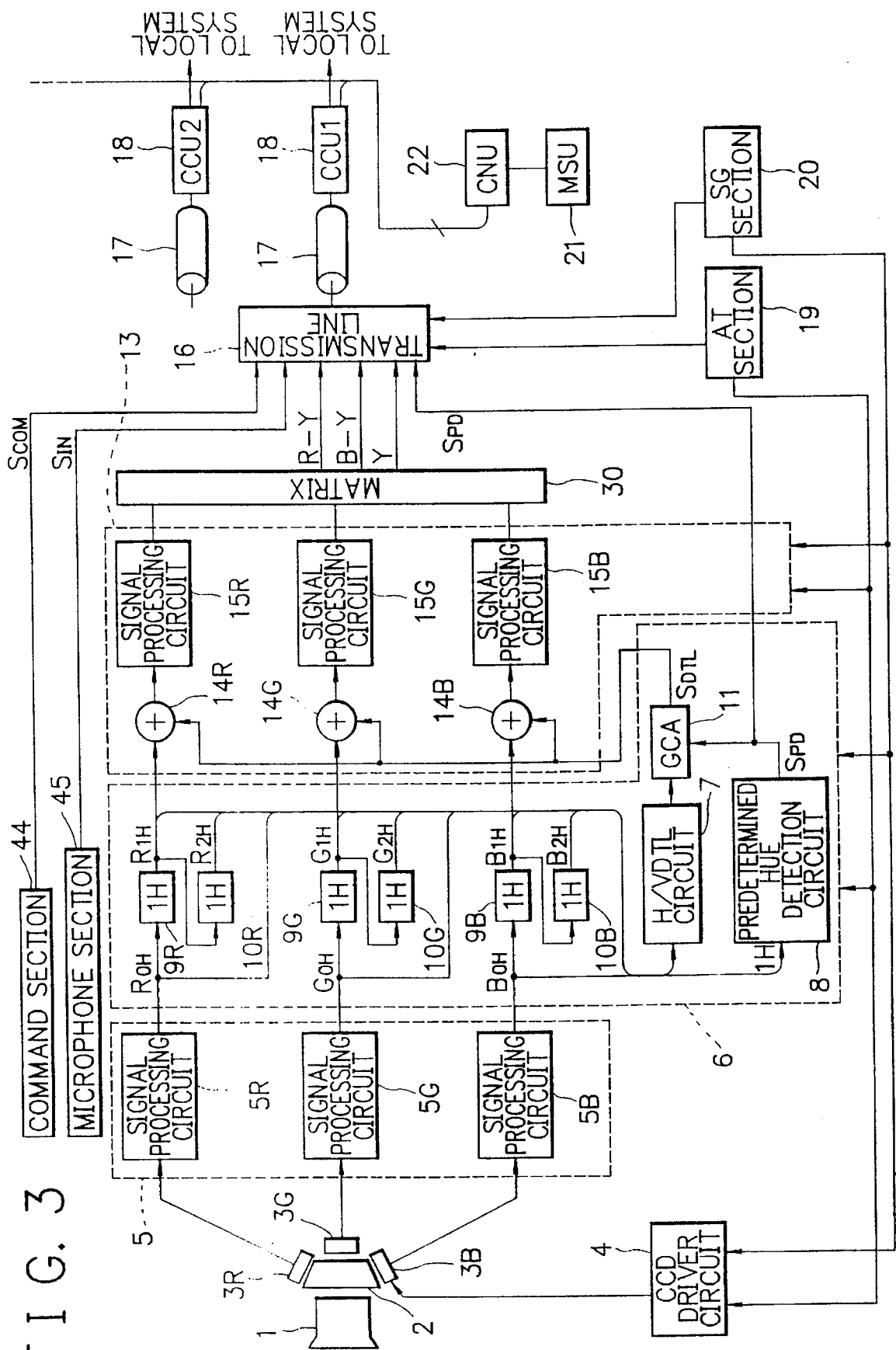
FIG. 3 is a block diagram of the whole configuration of a color video camera apparatus according to the present invention.

FIG. 3 shows a configuration of a color video camera apparatus. In FIG. 3, an incident optical image passing through an image pickup lens 1 From an object is applied to a color separation prism 2 for separating the optical image into red, green and blue lights that are led to CCD solid state type image pickup devices 3R, 3G and 3B respectively. The red, green and blue images of the target are focused on image pick-up surfaces of the pickup devices 3R, 3G and 3B and then they are picked up. A CCD driver circuit 4 drives the image pickup devices 3R, 3G and 3B.

Red, green and blue signals from the image pickup devices 3R, 3G and 3B are applied respectively to signal processing circuits 5R, 5G and 5B that construct a video amplifier (VA) section 5. Each of the signal processing circuits 5R, 5G and 5B comprises a shading correction circuit for black, a circuit of increasing a gain for a light quantity of a low level by +3 dB, +6 dB and the like, a gain control circuit for compensating a white balance and a white shading, a flare correction circuit and the like.

The red, green and blue signal from the signal processing circuits 5R, 5G and 5B in the video amplifier section 5 are applied to an image enhancement (IE) section 6. In other words, the red signal ROH, green signal GOH and blue signal BOH produced respectively from the signal processing circuits 5R, 5G and 5B are applied to a forming circuit (detail circuit) 7 for forming a signal representative of enhanced horizontal/vertical borders. The red, green and blue signals from the signal processing circuits 5R, 5G and 5B are applied respectively to a series connection of delay circuits of 9R and 10R, a series connection of delay circuits 9G and 10G and a series connection of delay circuits 9B and 10B. A delay time of each delay circuit 9R, 9G, 9B, 10R, 10B or 10B corresponds to one horizontal period (1H).

The delay circuits 9R, 9G and 9B produce respectively a red signal R1H, a green signal G1H and a blue signal B1H of one horizontal period delay and the delay circuits 10R, 10G and 10B produce respectively a red signal R2H, a green signal G2H and a blue signal B2H of two horizontal period delay. These delayed signals are applied to the forming circuit 7. The forming circuit 7 generates an emphasis horizontal border signal and an emphasis vertical border signal as a function of the red signals ROH, R1H, the green signals GOH, G1H and the blue signals BOH, B1H. This forming circuit 7 further adds the horizontally and vertically image emphasis signals to each other for producing an image emphasis signal. A gain control amplifier 11 controls a level of the image emphasis signal from the forming circuit 7 and produces an image emphasis signal SDTL.

A predetermined hue detection circuit 8 receives the red signal R1H, the green signal G1H and the blue signal B1H delayed one horizontal period by the delay circuits 9R, 9G and 9B respectively. This predetermined hue detection circuit 9 detects a predetermined hue part, e.g., a skin tone (flesh color) in this example. A predetermined hue gate signal SPD from the detection circuit 8 is applied as a gain control signal to the amplifier 11. In this instance, the gain of the amplifier 11 is reduced for the predetermined hue part so that the level of the image emphasis signal SDTL from the amplifier 11 is reduced. Since the level of the image emphasis signal SDTL is low for the hue part of the skin tone, the enhancing quantity of the border of, for example, a human face is reduced.

Adders 14R, 14G and 14B of a process (PR) section 13 respectively receive as main line video signals the red signal R1H, the green signal G1H and the blue signal B1H from the delay circuits 9R, 9G and 9B of the image enhancement section 6 and add the image emphasis signal SDTL to them. The added result signals are applied to signal processing circuits 15R, 15G and 15B. Each of the signal processing circuits 15R, 15G and 15B comprises a pedestal component adding circuit, a knee circuit for compressing a dynamic range, a gamma correction circuit, a white clipping circuit, a black clipping circuit, etc.

A matrix circuit 30 receives the red, green and blue signals from the signal processing circuits 15R, 15G and 15B of the process section 13. For example, the matrix circuit 30 converts the tri-color signals of the red, green and blue signals into a luminance signal, a red color difference signal and a blue color difference signal. The luminance signal Y, the red color difference signal R-Y and the blue color difference signal B-Y provided from the matrix circuit 30 and the predetermined hue gate signal SPD provided from the predetermined hue detection circuit 8, are supplied to a transmission apparatus 16.

A microphone section 45 is comprised of a microphone and an audio-electric conversion circuit, and outputs a mic data into which a sound from the microphone is audio-electric-converted, and an audio signal provided from peripheral equipment, as an intercom signal Sin, which are supplied to the transmission circuit 16. A command section 44 outputs a command signal Scom such as internal and external commands to the transmission circuit 16.

An automatic (AT) section 19 communicates with the camera control unit 18, controls an analog circuit and an on/off circuit in the camera and adjusts an automatic setup operation. A signal generator (SG) section 20 generates many kinds of timing pulses.

The luminance signal Y and the predetermined hue gate signal SPD which are provided to the transmission circuit 16 are applied to a quadrature (QAM) modulator 16d as shown in FIG. 1. An I-axis modulator 16e receives the luminance signal Y for modulating it and the I-axis modulated signal from the modulator 16e is applied to an adder 16g. Similarly, a Q-axis modulator 16f receives the predetermined hue gate signal SPD for modulating it and the Q-axis modulated signal from the modulator 16f is applied to the adder 16g. The intercom signal Sin and the command signal Scom, which are inputted to the transmission circuit 16 and are appropriately modulated, is added by an adder 27a, which outputs a RF signal SRF2. The red color difference signal R-Y and the blue color difference signal B-Y, which are inputted to the transmission circuit 16 and are appropriately modulated, are added by an adder 27b, which outputs a RF signal and SRF5.

The added signal from the adder 16g, namely, the quadrature modulated signal SRF3 is added to another RF signals SRF2 and SRF5 by the adder 16c and then applied to the branching filter 18a in the camera control unit 18 via the cable 17.

The branching filter 18a produces the quadrature modulated signal SRF3 and another RF signals SRF2 and SRF5 separately. The quadrature modulated signal SRF5 from the branching filter 18a is applied to a quadrature (QAM) demodulator 18c consisting of an I-axis demodulator 18d and a Q-axis demodulator 18e. The I-axis demodulator 18d demodulates the I-axis modulated signal component in the quadrature modulated signal SRF3 so as to generate the luminance signal Y. The Q-axis demodulator 18e demodulates the Q-axis modulated signal component in the quadrature modulated signal SRF3 so as to generate the predetermined hue gate signal SPD.

The RF signal SRF2 outputted from the branching filter 18a is separated into the intercom signal Sin and the command signal Scom by demodulators 29a and 29b, which signals are outputted to the intercom line and the command line, respectively. The RF signal SRF5 outputted from the branching filter 18a is separated into two signals, which are demodulated by a R-Y demodulator 28a and a B-Y demodulator 28b, respectively, and are supplied to a chroma encoder 40. A chroma signal 41 from the chroma encoder 40 and the luminance signal Y are added by an adder 42 to form a video signal Sv. The video signal Sv is outputted to a video signal main line, and is added to the predetermined hue gate signal SPD by an adder 18f. The added signal (Sv+SPD) is used as a monitor video signal to indicate the range for the predetermined hue gate signal SPD, for example, with a white area on a monitor screen. Thus, it is possible to observe by the monitor screen the hue range where the predetermined hue gate signal SPD is produced.

This embodiment modulates the luminance signal Y and the predetermined hue gate signal SPD in the quadrature modulation manner and transmits the result signal from the camera section side to the camera control unit 18 so that the luminance signal Y and the predetermined hue gate signal SPD can be separated from each other well in the camera control unit 18. The added signal (Sv+SPD) consisting of the video signal Sv and the predetermined hue gate signal SPD from the adder 18f can be used as the monitor video signal and the video signal Sv from the adder 42 can be used for another usage. Therefore, while the video signal Sv is used for another usage, such as the on-air purpose, the range of the predetermined hue gate signal SPD can be observed on the monitor screen and the camera control unit side 18 can change the hue to be detected in order to adjust the resulted range of the predetermined hue gate signal SPD. The range of the predetermined hue gate signal SPD can be set in a real time manner even if a color temperature of the object changes or a different object is picked up for the on-air period.

A reference number 21 represents a master setup unit (MSU) having a control panel for setting up each camera. Data from the master setup unit 21 are balanced by a command network unit (CNU) 22 for applying the data to the camera control unit (CCU) 18 of each camera. Therefore, the setup of each camera can be established by operating the master setup unit 21.

Figure 4:
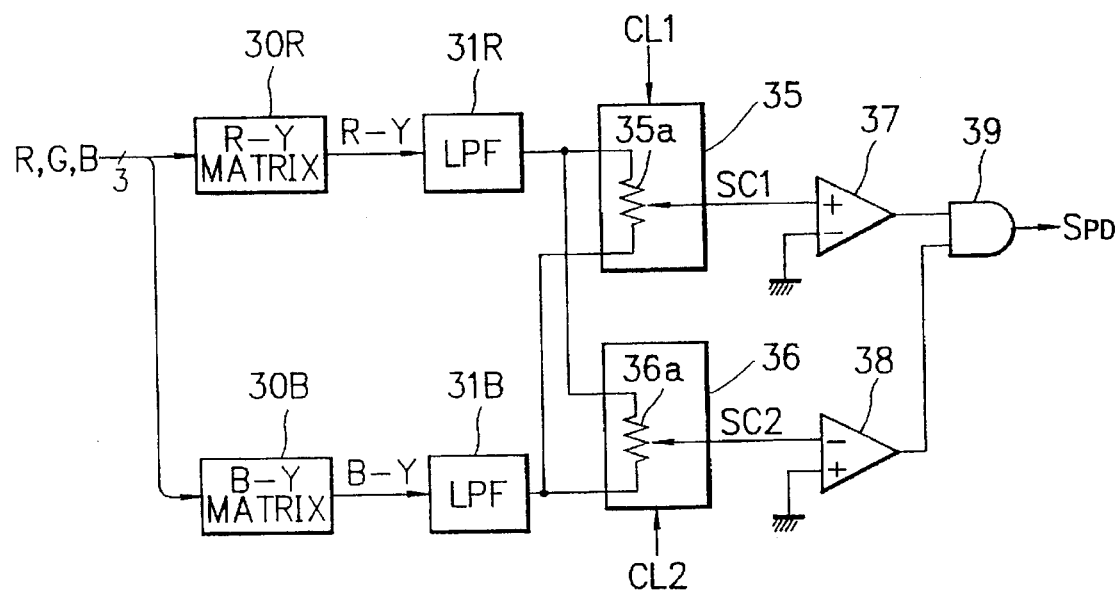
FIG. 4 is a block diagram of one example of a predetermined hue detection circuit.

Further, FIG. 4 illustrates a configuration example of the predetermined hue detection circuit of a prior art. In this drawing, the red signal R, the green signal G and the blue signal B are applied to matrix circuits 30R and 30B that convert them into the red color difference signal R-Y and the blue color difference signal B-Y. Lowpass filters 31R and 31B receive the color difference signals R-Y and B-Y from the matrix circuits 30R and 30B respectively so as to limit the bandwidth thereof. These lowpass filters 31R and 31B reduce aliasing components in the color difference signals R-Y and B-Y that are special to the CCD camera.

Variable addition ratio type adders 35 and 36 receive the color difference signals R-Y and B-Y whose bandwidths are limited by the lowpass filters 31R and 31B. These adders 35 and 36 consist of variable resistors 35a and 36a respectively and receive control signals CL1 and CL2 so as to control the addition ratio.

Since the adder 35 controls the addition ratio of the color difference signals R-Y to B-Y as a function of the control signal CL1, this adder produces a color component SC1 of any desired hue axis P1 within 90 degrees between the B-Y and R-Y axes. Similarly, since the adder 36 controls the addition ratio of the color difference signals R-Y to B-Y as a function of the control signal CL2, this adder generates a color component SC2 of any desired hue axis P2 within 90 degrees between the B-Y and R-Y axes.

The signal component SC1 of the hue axis P1 from the adder 35 is applied to a positive input terminal of a comparator S7 having a grounded negative input terminal. The signal component SC2 of the hue axis P2 from the adder 36 is applied to a negative input terminal of a comparator 38 having a grounded positive input terminal. When the signal component SC1 is positive, the comparator S7 generates a high level signal "H" When the signal component SC2 is negative, the comparator S8 generates the high level signal "H".

Figure 5:
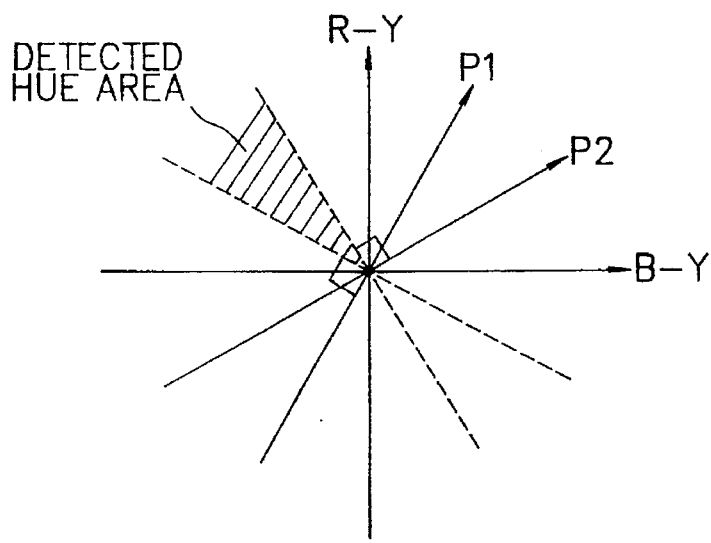
FIG. 5 is to explain an operation of detecting the predetermined hue.

The output signals from the comparators 37 and 38 are applied to an AND circuit S9 for the logical AND process. In this case, the AND circuit 39 generates the high level signal "H" when the signal component SC1 of the hue axis P1 is positive and the signal component SC2 of the hue axis P2 is negative. In other words, the AND circuit S9 produces the high level signal "H" for a diagonal line area shown in FIG. 5 and the high level signal "H" from the AND circuit 39 is used as the predetermined hue gate signal SPD. It is possible to change the diagonal line area or the detected hue range by varying the hue axes P1 and P2 under control of the addition ratio of the adders 35 and 36.

Figure 2:
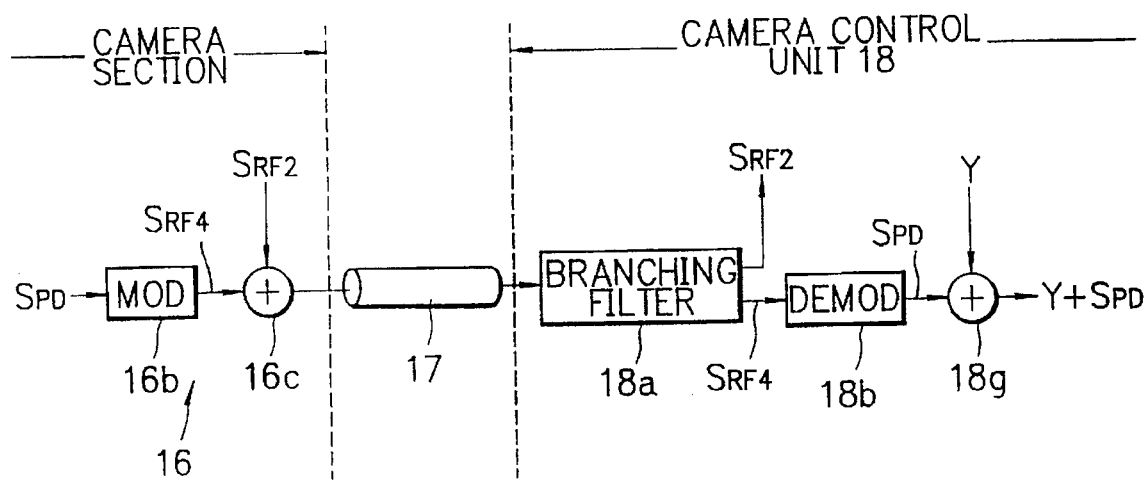
FIG. 2 is a block diagram of second embodiment of the video camera apparatus according to this invention.

Another embodiment of this invention will be discussed by reference to FIG. 2. This embodiment transmits the predetermined hue gate signal SPD via an independent channel from the camera side to the camera control unit 18. The same reference numbers in FIG. 2 have been designate like parts in FIG. 1 and only the difference will be discussed.

In this drawing, the transmission circuit 16 of the camera section side modulates the predetermined hue gate signal SPD by the modulator 16b so as to generate an RF signal SRF4. The adder 16c adds the RF signal SRF4 to another RF signal SRF2 and transmits the added signal to the branching filter 18a of the camera control unit 18 via the cable 17.

The branching filter 18a generates the RF signal SRF4 and another RF signal SRF2 separately. The demodulator 18b receives the RF signal SRF4 from the branching filter 18a and demodulates it to produce the predetermined hue gate signal SPD. An adder 18g adds the predetermined hue gate signal SPD to the luminance signal Y that has been transmitted via another channel from the camera section side in order to form the added signal (Y+SPD). This added signal (Y+SPD) becomes the monitor video signal and thereby the monitor screen displays the range of the predetermined hue gate signal SPD as, for example, the white indicator. Therefore, it is possible to observe the range of the predetermined hue gate signal SPD on the monitor screen.

Since the predetermined hue gate signal SPD is transmitted from the camera section side to the camera control unit 18 via the channel independent from the channel of the luminance signal Y in this embodiment, the added signal (Y+SPD) from the adder 18g, consisting of the luminance signal Y and the predetermined hue gate signal SPD, can be used as the monitor video signal while the luminance signal transmitted via another channel can be used for another purpose. Therefore, when the luminance signal Y is used for another purpose, such as the on-air operation, the range of the predetermined hue gate signal SPD can be observed by the monitor screen and the such a range for the predetermined hue gate signal SPD can be adjusted by changing the hue to be detected in the camera control unit side 18. Similarly to the embodiment of FIG. 1, even if the color temperature of the object changes or a different object is picked up during the on-air period, the range of the predetermined hue detection can be adjusted in a real time manner.

It was not discussed hereinbefore but may be possible that the predetermined hue gate signal SPD and another signal are transmitted from the camera section side to the camera control unit 18 in a time division multiplexing manner and the predetermined hue gate signal is separated from another signal in the camera control unit 18. In this instance, for example, the predetermined hue gate signal may be time compressed and inserted into a blanking period of the video signal, such as the luminance signal in order to be transmitted.

In the above embodiment, the predetermined hue gate signal SPD is transmitted via the cable 17 from the camera section side to the camera control unit 18. However, another exclusive cable may be used to transmit such a signal SPD.

According to the invention, the predetermined hue gate signal is transmitted from the camera section to the camera control unit or section and the predetermined hue gate signal is added to the video signal from the camera section so as to form the monitor video signal. An image of, for example, a white indication is displayed on the monitor screen within the range where the predetermined hue gate signal is produced. Thus, it is possible to observe the hue range of the predetermined hue gate signal with the monitor screen. In addition, the monitor video signal is the added signal of the video signal and the predetermined hue gate signal from the camera section and only the video signal from the camera section can be used for another purpose without being affected by the predetermined hue gate signal. Therefore, when the video signal from the camera section is used for another purpose, such as an on-air operation, the range of the predetermined hue gate signal can be observed on the monitor screen so that the range of the predetermined hue gate signal can be adjusted by changing the detected hue in the camera control unit side.

It will be obvious to those having skill in the art that many changes may be made in the above-described details of the preferred embodiment of the present invention. The scope of the present invention, therefore, should be determined according to the following claims.

What is claimed is:

1. A video camera comprising:

a lens;

a camera block for converting optical images from said lens into video signals;

means for generating image emphasis signals from said video signals;

means for detecting a portion of a predetermined hue of said video signals and generating hue gate signals representing said portion of said predetermined hue;

adding means for adding said image emphasis signals to said video signals;

quadrature two phase modulating means for separately composing at least a portion of said added signals and said hue gate signals by quadrature two phase modulating said hue gate signals and said at least a portion of said added signals so as to provide composite signals; and output means for outputting said composite signals.

2. A video camera comprising:

a lens;

a camera block for converting optical images from said lens into video signals;

means for generating image emphasis signals from said video signals;

means for detecting a portion of a predetermined hue of said video signals and generating hue gate signals representing said portion of said predetermined hue;

adding means for adding said image emphasis signals to said video signals;

first outputting means for outputting said hue gate signals; and second outputting means for outputting at least a portion of said added signals.

3. A camera controlling unit comprising:

inputting means for inputting video signals and composite signals composed of said video signals and hue gate signals representing a portion of predetermined hue of said video signals by quadrature two phase modulation;

quadrature two phase demodulating means for separating said composite signals into said video signals and said hue gate signals by quadrature two phase demodulating said composite signals;

adding means for adding said hue gate signals to said video signals;

first outputting means for outputting said video signals; and second outputting means for outputting outputs of said adding means.

4. A camera controlling unit comprising:

first inputting means for inputting video signals from a video camera;

second inputting means for inputting hue gate signals representing a portion of a predetermined hue of said video signals from said camera;

adding means for adding said video signals and said hue gate signals;

first outputting means for outputting said video signals; and second outputting means for outputting outputs of said adding means.

5. A video camera system comprising:

a video camera having a lens, a camera block for converting optical images from said lens into video signals, means for generating image emphasis signals from said video signals, means for detecting a portion of a predetermined hue of said video signals and generating hue gate signals representing said portion of said predetermined hue of said video signals, adding means for adding said image emphasis signals to said video signals, and quadrature two phase modulating means for separately composing at least a portion of said added signals and said hue gate signals by quadrature two phase modulating said hue gate signals and said at least a portion of said added signals so as to provide composite signals;

a camera control unit having inputting means for inputting said composite signals, and quadrature two phase demodulating means for separating said composite signals into said at least a portion of said added signals and said hue gate signals by quadrature two phase demodulating said composite signals; and transmitting means for transmitting said composite signals from said video camera to said camera control unit.

6. A video camera system comprising:

a video camera having a lens, a camera block for converting optical images from said lens into video signals, means for generating image emphasis signals from said video signals;

means for detecting a portion of a predetermined hue of said video signals and generating hue gate signals representing said portion of said predetermined hue of said video camera, adding means for adding said image emphasis signals to said video signals, first outputting means for outputting said hue gate signals, and second outputting means for outputting at least a portion of said added signals;

a camera control unit having first inputting means for inputting said hue gate signals, second inputting means for inputting said at least a portion of said added signals, and adding means for adding said hue gate signals to said at least a portion of said added signals;

first transmitting means for transmitting said hue gate signals from said video camera to said camera control unit; and second transmitting means for transmitting said at least a portion of said added signals from said video camera to said camera control unit.

7. A signal transmitting method for transmitting video signals and hue gate signals representing a portion of a predetermined hue of said video signals between a video camera and a camera control unit comprising the steps of:

generating video signals from optical images from an object at said video camera, generating said hue gate signals from said video signals, separately composing said video signals and said hue gate signals by quadrature two phase modulating said hue gate signals and said video signals so as to provide composite signals, transmitting said composite signals from said camera to said camera control unit, inputting said composite signals transmitted from said camera at said camera control unit, and separating said composite signals into said video signals and said hue gate signals by quadrature two phase demodulating said composite signals.

* * * * *